Dec. 9, 1969  D. CECCUCCI  3,482,880
DEVICE FOR IMPROVING THE TRACTION, STABILITY AND
FLOTATION OF VEHICLES WITH TIRED WHEELS
Filed Oct. 19, 1967  4 Sheets-Sheet 2

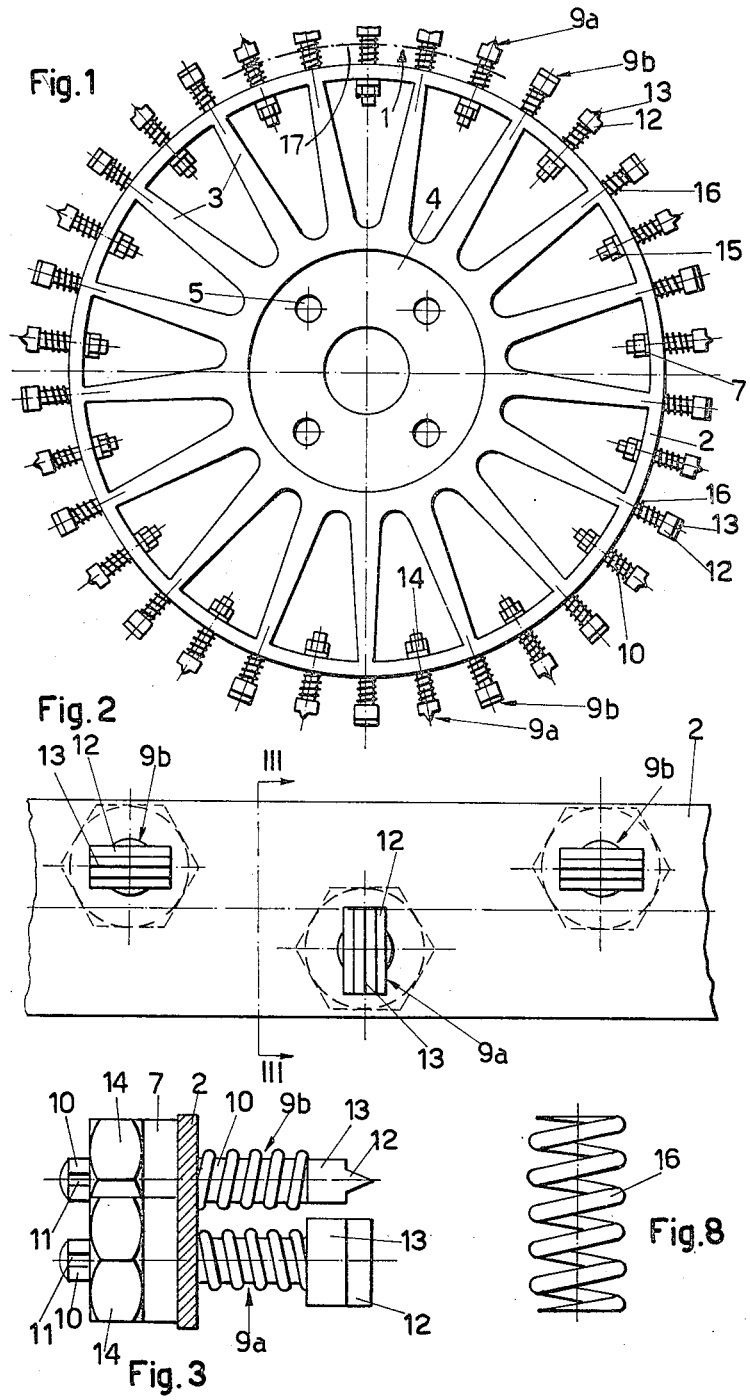

INVENTOR.
D. Ceccucci
BY
Richards & Geier
ATTORNEYS

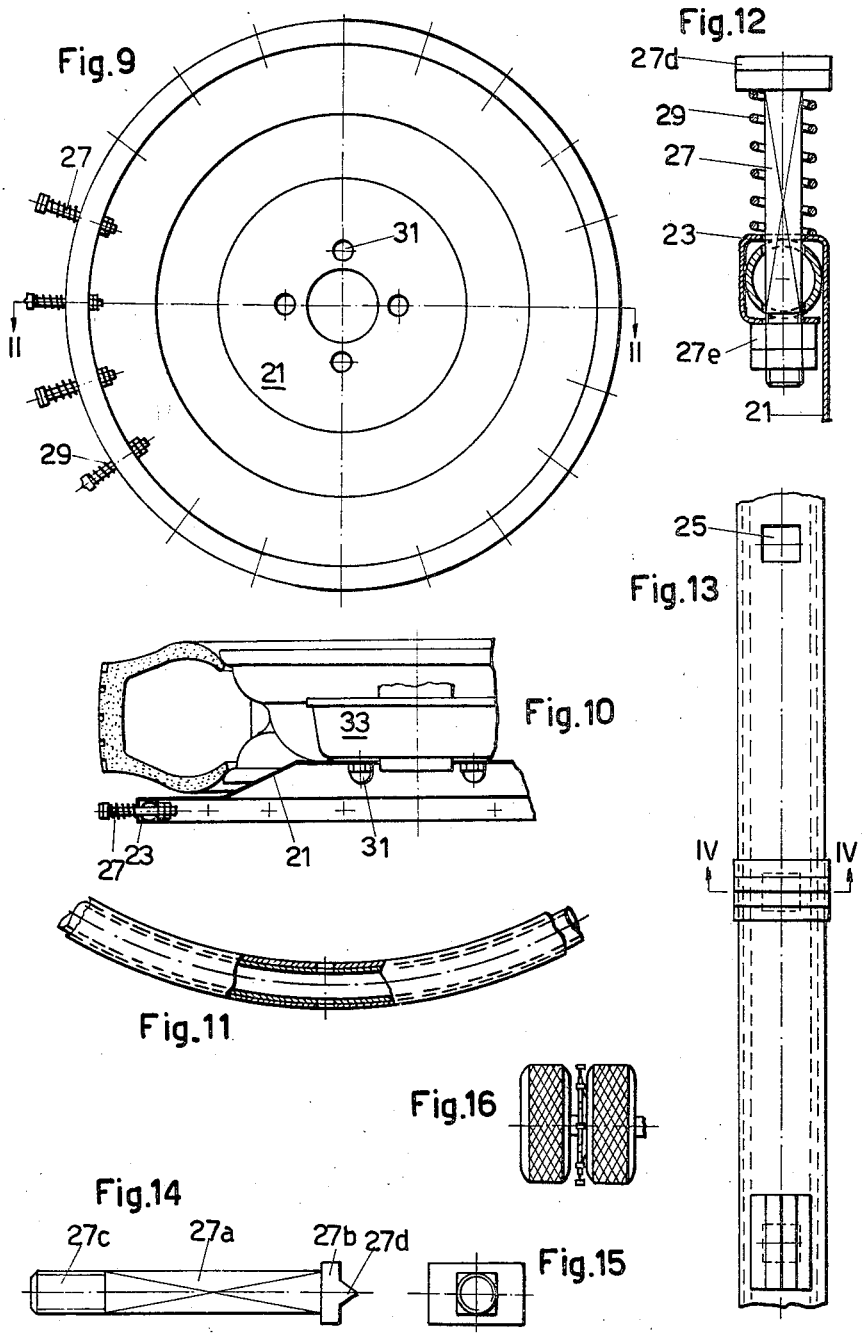

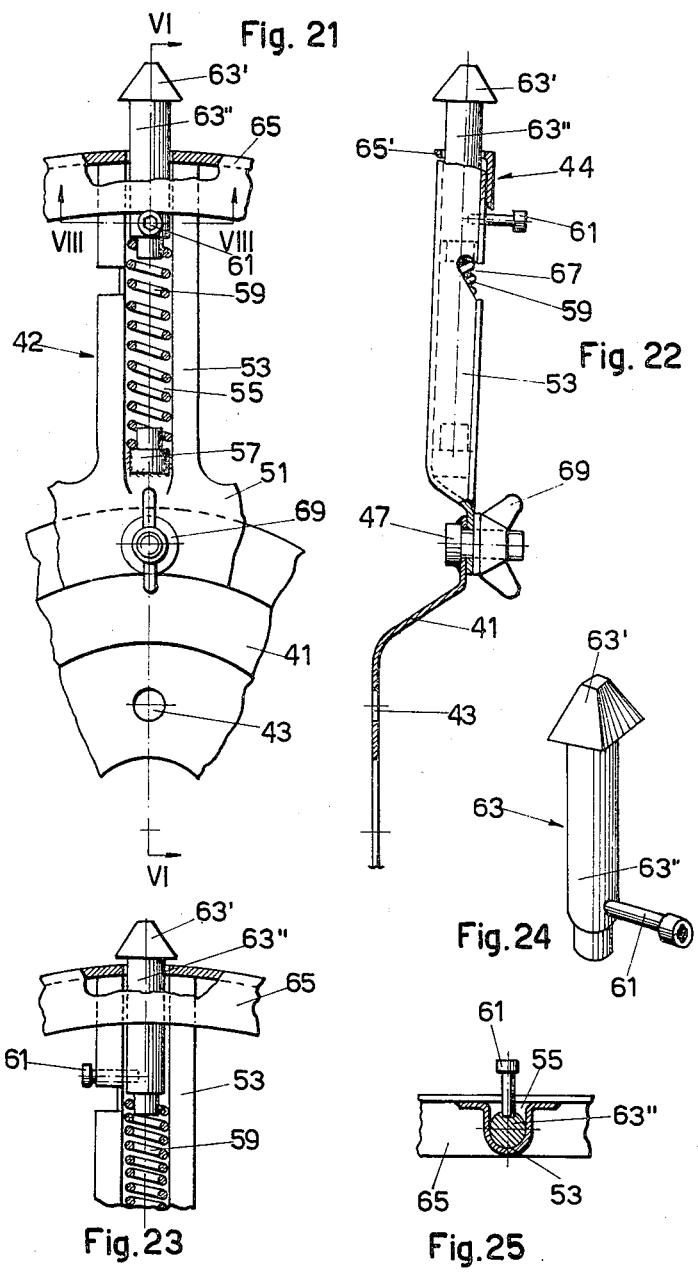

United States Patent Office 3,482,880
Patented Dec. 9, 1969

3,482,880
DEVICE FOR IMPROVING THE TRACTION, STABILITY AND FLOTATION OF VEHICLES WITH TIRED WHEELS
Domenico Ceccucci, Via Banchi Vecchi 50, Rome, Italy
Filed Oct. 19, 1967, Ser. No. 676,399
Claims priority, application Italy, Jan. 12, 1967, 3,411/67; May 15, 1967, 36,765/67
Int. Cl. B60b 15/04
U.S. Cl. 301—47      5 Claims

ABSTRACT OF THE DISCLOSURE

A device improving the traction of a vehicle wheel which includes a round body carrying a plurality of spikes. Each spike has a head adapted to engage the ground and a shank extending toward the wheel axle and pressed outwardly by a separate spiral spring.

---

For alleviating the danger of vehicle tires skidding on roads covered with slippery material such as snow or ice, or mud, chains are usually used which are fastened on the vehicle tires. The operation of attaching the chains to a wheel casing and of taking them off, as everybody knows, is quite complicated and wearisome. Furthermore, the motor vehicles when equipped with chains do not hold their course and frequently slip sidewise, so that driving a vehicle in such conditions becomes very difficult.

It is therefore an object of this invention to provide an antiskid device for motor vehicles, adapted for being readily attached or taken off from a tired wheel and which does not hinder the performance of a travelling vehicle.

The device of this invention, in its general layout comprises a circular flat body on the strengthened peripheral rim of which a plurality of spikes are mounted which are radially slidable along through holes of said rim, against the force of a helical spring. The whole device is to be mounted at the side of a tired wheel or between the two tires of a twin wheel by means of the same structural members which serve for attaching the wheel to the vehicle hub; which device can be readily partially or totally removed when the use of it is no more required.

The radial spikes are provided with a head of particular shape adapted for taking hold on the ground and with a shank which extends towards the wheel axis; said spikes are forced outwardly of the wheel periphery by means of a helical spring and resiliently yielding under the vehicle weight, they slide along their respective holes of the peripheral rim accompanying the movement of the tire when this is depressed due to the vehicle weight.

The initial position of the spikes is so adjusted that their pointed ends define a circumference the radius of which is equal to the radius of the tire when this is not depressed. In these conditions, the spike spring is only partially depressed; starting from this position the spikes are allowed to move towards the wheel axis for a distance just equal to the maximum allowed depression of the tire, at which final position, the spike string is totally depressed. Otherwise, a major amount of the vehicle weight would be discharged on the road surface through the spikes; and this is not within the intended scope of the invention.

According to a first embodiment of this invention, the antiskid device comprises a plurality of spokes which from a central flat disk extend radially to reach a peripheral rim consisting of a metal band coaxial with the vehicle wheel, on which rim the radially projecting spikes are fitted.

During their radial movement the spikes are guided by cylindrical bushings which are provided to this purpose along the whole circumference of the peripheral band of the device.

Each spike comprises a shank slidable within the corresponding bushing on the band and a head of special form projecting from the same bushing.

Between the outer surface of the peripheral band and the spike head, a cylindrical spiral spring is inserted which forces the spike radially outwardly for a distance which is adjusted by means of a nut and a lock nut which engage the threaded portion of the spike shank projecting inwardly from the peripheral band, which nut abuts against the inner end face of the bushing wherein the spike shank is guided; and which is welded on the peripheral band. The spike head is a prismatic small block rectangular in plan view which, along the median line parallel to the larger side of the rectangle has a projecting tooth with triangular cross-section which may be isosceles or equilateral.

The device according to the first embodiment comprises two rows of spikes as described. A first row comprises spikes of which the heads are orientated in a way that said tooth is disposed parallel to the axis of the vehicle wheel, while the spikes of the second row have their heads orientated in a way that the ridges of their teeth are lying in a plane perpendicular to the vehicle wheel axis. The spikes of the first row are an aid to the traction of the vehicle, while those of the second row prevent the sideways slipping of the vehicle. Furthermore the spikes of a row are staggered with respect to the spikes of the other row.

According to a second embodiment, the central flat disc is a pressed metal sheet solid disc with a box cross-section peripheral rim, so that a circular channel is formed having a square or rectangular cross-section, which rim is made of the same metal sheet as the central disc and is integral therewith; the spikes are slidably mounted within square holes which extend radially through said peripheral rim, the latter being suitably reinforced around said holes by means of small blocks welded inside the channel; said spikes are arranged at regular intervals along said rim of the disc in a single row with their heads so orientated about the spike axis that said projecting tooth of each spike is disposed alternately in the direction of the wheel axis and perpendicular thereto.

According to the second embodiment, the spike comprises a square shank having a head at one end and a threaded portion at the other end for engaging an adjustable nut which is provided with a locking nut or which is an elastic stop nut. The number of the spikes of a wheel does not change when the wheel size changes, while the size of them changes proportionally to the size of the wheel.

According to a third embodiment of this invention, the spike-carrying body is made of a central disk having the form of a bowl which is permanently mounted on the vehicle wheel, even when the conditions of the road do not require the use of the device of this invention; and of a spoked plate on which the spikes are mounted.

The spikes are mounted each on a spoke of the spoked plate; which spoke has a channel lengthwise thereof for guiding the spikes in their radial movement and for receiving a spring therein, which forces the spike outwardly.

The peripheral rim of the device comprises a profiled metal structure with L cross-section.

Each spike can be locked in its retracted position by means of a peg attached to the side of the spike shank, which peg is the means for depressing manually the spring of the spike and thereafter for retaining it in a retracted position through engagement of the peg with a catch of the spoke. This improvement, along with that of the preceding paragraph, offers a twofold means for inactivating the device without lifting the vehicle on the jacks for removing the nuts which connect the device to the wheel.

A first way of inactivating the device consists in locking the spikes in their retracted position, while a second way consists in disconnecting the spoked plate and related attachments from the bowl-shaped disc.

The spring which forces outwardly each spike is located in a position within the peripheral rim. The outer diameter of the peripheral rim of the device is consequently only a little smaller than that of the depressed tire, so that the rim can contribute in discharging on the ground a portion of the load applied to the vehicle wheel; said portion being proportional to the width of the flange of the rim which faces the ground.

The number of the spikes is proportional to the wheel diameter and their head is a square base pyramid with a fairly blunted point. This form ensures a good traction of the wheel and a stabilizing action sideways of the vehicle without causing any damage to the road surface even at high travelling speed.

The above three preferred embodiments of this invention will now be described in detail as non limitative examples thereof with reference to the attached drawings wherein:

FIG. 1 is a side view of the antiskid device according to the first embodiment of the invention;

FIG. 2 is a partial top view of the device of FIG. 1;

FIG. 3 shows a cross-section of the rim on which the spikes are mounted; said section being made along line III—III of FIG. 2;

FIG. 8 is a side view of a spring for forcing outwardly the spike according to the first embodiment of the invention;

FIG. 9 is a schematic front view of the device according to the second embodiment of the invention;

FIG. 10 is a diametral cross-section of a portion of a vehicle wheel equipped with the device of FIG. 9;

FIG. 11 shows a side view partially sectional of a portion of the channel-like peripheral rim of the bearing disk of FIG. 9;

FIG. 12 is a side view partially sectional of a spike in its mounted position through the peripheral channel of the bearing disk; the partial section being made along line IV—IV of FIG. 13;

FIG. 13 is a view perpendicular to the wheel axis of a portion of the device; two spikes are shown mounted along with the hole for receiving a third spike;

FIG. 14 is a side view of a bare spike;

FIG. 15 is a front view of a spike as seen from its threaded end;

FIG. 16 illustrates a device conforming to the general layout of the second embodiment which is inserted between the two tires of a twin wheel;

FIG. 21 is a view along the wheel axis of a portion of the spoked plate of FIG. 19 along with one of the spikes mounted thereon and a portion of the peripheral rim of the device;

FIG. 22 is a partial cross-section of the device of FIG. 21 along line VI—VI thereof;

FIG. 23 shows the spike of FIG. 21 in its depressed and locked position;

FIG. 24 is a perspective view of the spike of FIG. 21 along with the related locking lever;

FIG. 25 shows a cross-section of the spike of FIG. 21 along with the related spoke of the spoked plate; the section being made along a plane containing the axis of the locking lever.

FIGS. 1 to 8 illustrate the first embodiment of the invention; FIGS. 9 to 16 the second embodiment and FIGS. 17 to 25 the third embodiment.

Figure 4:
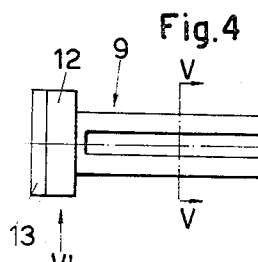
FIG. 4 is a side view of a single spike according to the first embodiment of the invention.
Figures 5, 6:
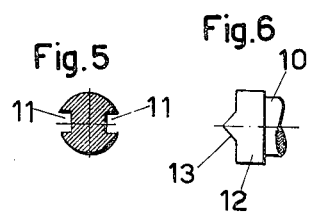
FIG. 5 shows a cross-section of the spike of FIG. 4 along line V—V thereof.
FIG. 6 is a side view of a portion of the spike of FIG. 4 as seen along arrow VI thereof.
Figure 7:
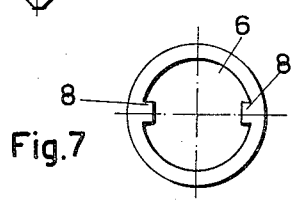
FIG. 7 is a front view of the bushing for receiving therethrough a spike as shown in FIGS. 4–6.

With reference to FIGS. 1 to 8 the device according to the first embodiment of the invention comprises a spike supporting rim 2 which, through a plurality of spokes 3 is attached to a central disk 4. These parts can consist of a single piece of forged steel or of two separate pieces that is of a spike supporting rim and a central flat disk 4, the two parts being connected to one another by means of spokes 3 welded thereto.

The central disk 4 is provided with holes 5 which are arranged in a way to coincide with the holes of a usual rim of a vehicle wheel. The antiskid device 1 of this invention can therefore be attached to a vehicle hub along with the wheel rim by means of the same nuts with which the latter is provided.

The spike supporting rim 2, at regular intervals along its periphery is provided with cylindrical through holes 6 (FIG. 7) which holes are lined with bushings 7 attached to the rim. Along the inner surface of bushings 7 two longitudinal ribs are provided for guiding the spikes and preventing them from rotating about their longitudinal axis.

The spikes, which are indicated in the figures by the numerals 9 and 9a, comprise a shank 10 with two longitudinal grooves 11 at their opposed sides for engaging the guiding ribs 8 of bushings 7 and of a bob-like head 12 which has an outwardly projecting tooth 13 with triangular cross section which may be isosceles or equilateral. The spikes may be identical to one another or one half of their total may have their projecting teeth 13 orientated in the direction of the centerline of the two grooves 11 (see spike 9b of FIG. 3), while the teeth of the other half are in a direction perpendicular to said centerline (see spike 9a of FIG. 3). This is because the spikes are fitted on the spike carrying rim 2 in such a way that one half of the spikes have their teeth parallel to the wheel axis and the other half perpendicular thereto. Obviously, in that case when the spikes are all identical, the bushings of one half of the spikes must be rotated about their longitudinal axis of 90 deg. with respect to the position of the other half of the bushing. As shown by FIGS. 2 and 3 the row of spikes 9a is laterally displaced with respect to the row of spikes 9b. In this way, the spikes 9a form an uninterrupted crown of elements for improving the wheel traction while the spikes 9b form an uninterrupted crown of elements which prevent the vehicle from skidding sideways.

The spike shanks 10 cannot rotate within bushings 7 but they are slidable along them. Their outward travel is limited by a stop means which according to this embodiment, is in the form of a nut 14 which engages a threaded portion 15 of the spike shank 10. For preventing the loosening of nut 14, a lock nut, not shown, may be used. The inward movement of spikes 9a and 9b is counteracted by springs 16 (FIG. 8) which are inserted between the spike head 12 and the spike supporting rim 2.

The radial position of spikes 9a and 9b with respect to rim 2 is adjusted in a way that they partially project from the periphery of the tire which is indicated by the dot and dash line 17 (FIG. 1).

When the spike heads 13 come to contact with the surface on which the vehicle is travelling, the spikes are depressed radially towards the wheel axis against the force of springs 16.

The spikes 9a take hold of the surface and ensure a good transmission of the traction on the ground, while spikes 9b ensure a good road holding.

With reference to FIGS. 9 to 16 the device of this invention according to a second preferred embodiment thereof comprises a bearing disk 21 made of metal sheet or other thin material which at its periphery is provided with a rim 23 having a box cross-section obtained by folding three times at square angle the peripheral portion of the sheet of which said bearing disk is made around a tube with circular cross-section.

Along the tube-shaped rim 23 so obtained, a single row of square through holes 25 is provided perpendicular to the wheel axis for receiving each a spike 27 comprising a shank 27a with square cross-section, a head 27b at one end of said shank and a threaded portion 27c at the other end. The spike head 27b is a small prismatic block with an outwardly projecting tooth 27d of substantially the same form as in the first embodiment. The spikes 27 are inserted through their respective holes of rim 23 in such a way that said tooth of each spike of the row of spikes is alternately orientated in the direction of the wheel axis and perpendicular thereto. Between the spike head 27b and the tubular rim 23 of the bearing disk 21, a helical spring 29 is inserted which forces the spike outwardly with respect to the wheel axis. On the threaded portion 27c of the spike an adjusting nut 27e is fitted along with a locknut. The latter is superfluous if nut 27e is an elastic stop nut. As already mentioned, the radius of the circumference tangential to the spike heads 27b, with the helical spring 29 totally depressed, should be smaller than the radius of the tire under the vehicle weight.

As shown by FIG. 10 the bearing disk 21 is attached to the vehicle wheel by means of the same nuts 21 by which the wheel is attached to the vehicle hub 33.

According to this second embodiment of the invention the bearing disk 21 is made of pressed steel or aluminium or aluminium alloy sheet, however, due to its form, it may also be conveniently obtained through die casting any type of plastic material and particularly laminated glass that is a material made of fiber glass impregnated with synthetic resins.

In the latter case, metal elements will be embedded in the disk wall at those areas where a concentration of stresses occurs such as the holes for receiving the hub studs and the holes for receiving the slidable spikes. The use of plastic or laminated glass makes the whole device more elastic and lighter, which is greatly desirable.

Figure 17:
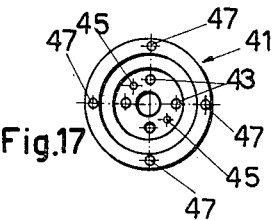
FIG. 17 is a side view of the innermost of the three major components of the device according to the third embodiment, that is the bowl-like central disk.
Figure 18:
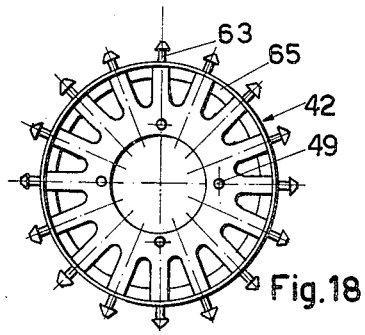
FIG. 18 is a view along the wheel axis of the spoked plate of the device according to the third embodiment.
Figure 19:
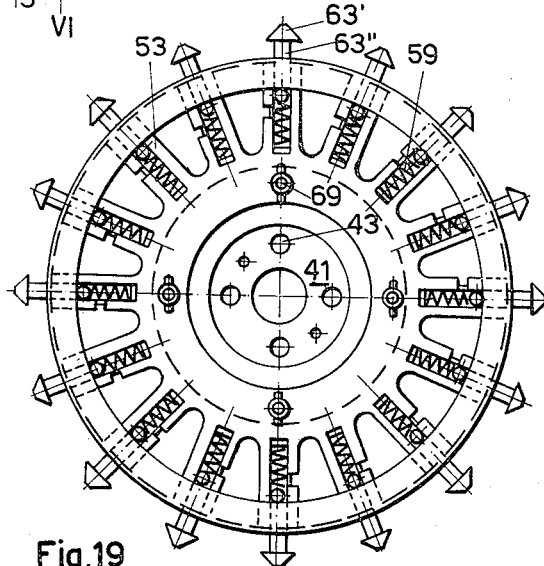
FIG. 19 illustrates the assembled device according to the third embodiment as seen from one side of the vehicle.
Figure 20:
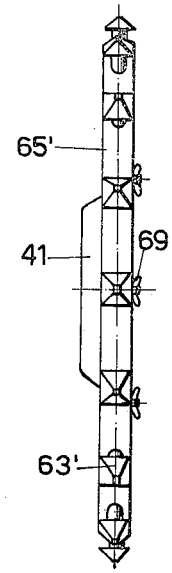
FIG. 20 is a view of the device of FIG. 19 as seen from a direction perpendicular to the wheel axis.

With reference to FIGS. 17–25, the device of this invention, according to a third embodiment, comprises a spoked plate 42 made of pressed metal sheet or other material; a bowl-shaped disk 41 provided with bolts 47 for coupling it to plate 42 and with holes 43 and 45 for coupling it to the vehicle wheel by means of the same bolts and dowels of which the wheel hub is provided, a peripheral rim 44 which is attached to the periphery of plate 42 and a plurality of spikes with the related springs in a number equal to the spokes of the spoked plate. The spike assembly (see FIGS. 21 and 22) comprises the spike proper 63 with its pyramidal head 63' and shank 63", which may have a circular or square cross-section, a cylindrical spiral spring 59 one end of which rests on a circular shoulder at the inner end of the spike shank obtained by reducing the shank diameter and the outer end rests on a similar shoulder provided in a stop block 57. The above components of the spike assembly are housed in a channel 55 which extends radially along the centerline of spoke 53.

A flat ring 51 completes the spoked plate 42, which ring may be integral with plate 42 or attached thereto and joins together the spoke ends closer to the wheel axis. At their other ends the spokes are joined together by means of the peripheral rim 44 with L cross-section of which a flange 65 lies on a plane perpendicular to the wheel axis while the other flange 65' lies on a cylindrical surface coaxial with the wheel.

Flange 65' is provided with holes for receiving the spike shanks 63" therethrough. Flange 65 is welded or anyway attached to the spokes 53 at the flat areas thereof which extend along the sides of channel 55. Block 57 is welded or anyway attached within channel 55 at its end closer to the wheel axis.

Each spike is provided with a lever 61 perpendicular to the spike shank which lever terminates with a knob. The purpose of lever 61 is for locking the spike in a retracted position; by manually acting on it the spike 63 can be moved radially against the force of spring 59 until the spike head abuts against the outer surface of the peripheral rim 44. At this point, lever 61 is inserted into a cut 67 of the metal sheet at the side of channel 55, whereby the spike is held in its retracted position.

The same lever, when not engaged into the cut 67, rests against flange 65 of the peripheral rim thereby preventing the spike from being ejected outwards. The bowl-like disk 41 is connected to the spoked plate 42 by means of a plurality of bolts 47 welded onto the same disk; these bolts are received into as many holes 49 along the flat ring 51 of the spoked plate 42 which is connected to the disk 41 by means of plain nuts or wing nuts.

It is apparent that many modifications and changes can be introduced in the embodiments above described; however, it should be understood that such modifications and changes are to be considered to be within the field of the appended claims whenever they are based on the same concept of this invention and aiming to the same scopes thereof.

What is claimed is:

1. A device to be mounted on a tire-carrying wheel having bolts attaching the wheel to a vehicle hub, said device comprising a central disk connected to the wheel by said bolts, an annular plate, bolts and nuts connecting said plate to said disk, a plurality of radial spikes having shanks with shoulders and carried in channels formed in said plate and heads adapted to engage the ground, a peripheral rim connected with said plate and having openings through which said spikes extend, said rim being L-shaped in cross section and having a flange extending perpendicularly to the wheel axis and another flange extending along a cylindrical surface coaxial with the wheel, a separate stop block located in each channel, and a separate spiral spring located in each channel and having one end engaging the stop block and another end engaging the shoulder of the spike shank, whereby the spring presses the spike outwardly.

2. A device as per claim 1 wherein each spike comprises a pyramidal head with square base and blunted point directed outwardly with respect to the wheel axis, a shank which passes with a large clearance through said hole of the cylindrical flange of the L-shaped bar and said shank extends for a distance into and along said channel of the spoke.

3. A device as per claim 1 in which the spokes of the spoked plate are integral with the circular ring which joins the spokes one to the other at their ends closest to the wheel axis.

4. A device as per claim 1 wherein the spike shank is provided with a lever perpendicular to the shank longitudinal axis and a cut is provided in the side wall of said channel of each spoke wherein said lever is inserted after moving the spike against the force of the spring until the spike head rests on the cylindrical flange of said L-shaped bar, whereby the spike is held in a retracted position.

5. A device as per claim 1 in which the three main components of the circular body are made of plastics or laminated plastics reinforced with glass fibres, or are made of rubber and in those points of said components where a concentration of stresses occurs, metal elements are embedded such as washers, bushings and the like.

References Cited

UNITED STATES PATENTS

| | | |
|---|---|---|
| 1,053,971 | 2/1913 | Butterfield. |
| 1,890,872 | 12/1932 | Van Kleeck _____ 301—51 |
| 2,437,325 | 3/1948 | Koeppel _____ 301—45 |
| 2,540,382 | 2/1951 | Sigler _____ 301—47 |

FOREIGN PATENTS 442,522  11/1948  Italy.

RICHARD J. JOHNSON, Primary Examiner

U.S. Cl. X.R.

301—51